United States Patent

Limb et al.

[15] 3,662,266

[45] May 9, 1972

[54] NONLINEARLY SAMPLED DIFFERENTIAL QUANTIZER FOR VARIABLE LENGTH ENCODING

[72] Inventors: John Ormond Limb, New Shrewsbury; Frank William Mounts, Colts Neck, both of N.J.

[73] Assignee: Bell Telephone Laboratories, Incorporated, Murray Hill, N.J.

[22] Filed: May 18, 1970

[21] Appl. No.: 38,317

[52] U.S. Cl. ........................................325/38 B, 178/DIG. 3

[51] Int. Cl. ........................................H04b 1/66

[58] Field of Search ........................325/38 R, 38 B, 321; 179/15.55 T, 15.55 R, 15 AC, 15 AP, 15 AV, 15 BW; 332/9, 11 R, 11 D; 178/DIG. 3

[56] References Cited

UNITED STATES PATENTS

| | | | |
|---|---|---|---|
| 3,422,227 | 1/1969 | Brown | 179/15.55 R |
| 3,383,461 | 5/1968 | Dryden | 325/38 B |
| 3,026,375 | 3/1962 | Graham | 179/15 AP |
| 3,090,008 | 5/1963 | Mounts | 179/15 AP |
| 3,225,315 | 12/1965 | Holzer | 179/15 BV |
| 3,249,870 | 5/1966 | Greefkes | 325/38 B |

*Primary Examiner*—Robert L. Richardson
*Attorney*—R. J. Guenther and E. W. Adams, Jr.

[57] ABSTRACT

A differential quantizer for predictive PCM transmission systems in which difference signals are quantized at the Nyquist rate when they are below a predetermined level but are quantized at twice the Nyquist rate when they exceed that level. The difference signals are encoded for transmission but an extra bit follows each code word representing a level above the predetermined threshold to indicate to the receiver whether that sample is to be inserted by the receiver at a Nyquist interval or one-half a Nyquist interval from the preceding sample. Where the difference signal to be encoded is large due to a substantial change in the input signal, several such samples taken at twice the Nyquist rate serve to rapidly reduce the difference signal and provide a better approximation of the input signal to the receiver.

3 Claims, 7 Drawing Figures

INVENTORS J. O. LIMB
F. W. MOUNTS
BY Leonard R. [signature]
ATTORNEY

NONLINEARLY SAMPLED DIFFERENTIAL QUANTIZER FOR VARIABLE LENGTH ENCODING

BACKGROUND OF THE INVENTION

This invention relates generally to pulse code communication systems and, more particularly, to apparatus to improve the response of predictive pulse code communication systems to large changes in the input signal.

In well known pulse code, or digital, communication systems the analog information signal is encoded, transmitted over a time divided transmission facility, and then decoded at the receiver. In the encoding process the analog information signal is first sampled at a fixed rate, known as the Nyquist rate, which is twice the frequency of the highest frequency component in the analog signal. The amplitudes of the samples are then approximated by a number of discrete values called quantization levels. Each of these quantization levels is represented by a pulse code word so that after each such approximation is made, each sample may then be transmitted as a pulse code word. At the receiver, the quantized samples are reconstructed from the pulse code and the analog information signal is in turn reconstructed from the samples. As long as a sufficient number of levels are used to approximate the analog samples, no objectionable amount of distortion is introduced into the transmitted signal. It may be appreciated, however, that the larger the number of quantization levels, the larger the number of code pulses that are needed for transmission. It is the number of code pulses that determines the required pulse rate and the bandwidth of the digital transmission system.

Predictive coding techniques have been developed in order to reduce the number of pulses that must be transmitted in order to describe a given analog signal. In these predictive coding systems, the actual values of the quantized samples are not encoded for transmission. Rather, the past samples are used in various ways in order to predict the value of the present sample, and only an error or difference signal is encoded. Since the amplitudes of the error samples are generally less than the amplitudes of the original samples, fewer quantization levels and, therefore, fewer code pulses are needed to encode the analog signal. In effect, the predictive systems are more efficient because they omit nonessential or redundant portions of the signal.

For the most part, the average television picture is particularly well suited to predictive coding techniques because each scan of the picture, which corresponds to one frame, will contain a great deal of redundancy from one point to the next. Unfortunately, however, when an edge of an object is encountered in a scan, the picture may change from light to dark and vice versa, causing a relatively large change in the video signal. At such a point, the picture is not well suited for predictive coding techniques because large error samples are produced which result in the edges of such objects becoming blurred.

In order to overcome the above-described disadvantage of predictive coding techniques as applied to television, various schemes to expand the quantizer scale whenever an error exceeds a predetermined threshold have been developed. In U.S. Pat. No. 3,422,227 issued to E. F. Brown on Jan. 14, 1969, a quantizer circuit having two scales is disclosed. A first scale is employed for the encoding of those portions of the scale which contain relatively modest changes in the video signal. When an edge of the picture is encountered which results in a large change in the video signal, the quantizer changes to a scale having more quantization levels so that the signal is more accurately quantized and the additional information is transmitted during the horizontal retrace time in each line of the picture.

Another technique for improving predictive coding systems is that disclosed in copending application Ser. No. 812,714 filed on Apr. 2, 1969, and now U.S. Pat. No. 3,568,063, in which the range of the quantizing circuit is increased by making additional predictions when changes in the input signal exceed a predetermined level. Since extra predictions are made in the feedback circuit, at such times the apparatus functions to more accurately quantize the input signal.

Both of the above-described techniques operate to increase the number of quantization levels either by actually providing increased levels when the signal change exceeds a predetermined level or by taking additional samples in the predictive feedback loop upon the occurrence of a large change in the input signal. They are both effective in eliminating the smearing problem but both have the disadvantage of requiring relatively complex quantizing circuits in order to accomplish the desired result. In addition, the apparatus described in the above-mentioned patent requires relatively complex apparatus capable of signaling the receiver with regard to the change in the number of levels.

It is an objective of the present invention to improve upon prior predictive coding systems by increasing the sampling rate during large changes in the information signal and to avoid the necessity of relatively complex quantizer circuits together with complex signaling apparatus by not changing the number of quantization levels as is done in the above-recited prior art.

SUMMARY OF THE INVENTION

The particular type of predictive coding system which is to be considered with the present invention is known in the art as a differential coding system. In such a system the analog signal to be encoded is applied to one input terminal of a subtractor circuit whose output is connected through a quantizer circuit to a coder circuit. The output of the quantizer circuit is fed back to the second input of the subtractor circuit so that the quantized and integrated output is subtracted from the analog signal, giving rise to the term differential coding.

The feedback signal from the quantizer insures that the output of the subtractor circuit is maintained at a low level during redundant portions of the input signal. When a large change occurs in the analog signal, a large change also occurs in the output of the subtractor circuit. Since the level of the output of the subtractor circuit is normally maintained at a relatively low level, the initial feedback signal from the quantizer circuit has little effect on the large change in the input signal. As a result, there is a large change in the output from the subtractor circuit. Since, in normal operation, the quantizer circuit is adapted to quantize only relatively small levels of signal, this large change is poorly handled by the quantizer circuit. The poor handling is because in successive frames of the same scan line the quantizer may quantize the difference signal in a different manner for each scan due to the inherent quantization error of the quantizer circuit. In addition, the large change is effectively clipped at the output of the quantizer circuit with the result that it takes several "turns around" the feedback loop for the feedback signals from the quantizer circuit to diminish a single large change in the original input signal. The failure to quantize in exactly the same manner in successive frames of the same line, plus the lag or catching up time of the quantizer, produces the smearing effect discussed generally above.

In accordance with the present invention the disadvantages of predictive coding systems when encountering large changes in the input signal are overcome by encoding the difference signal at the Nyquist rate only when that signal is below a predetermined level. Signals which exceed that predetermined level are encoded at twice the Nyquist rate. The difference signals are encoded for transmission but an extra bit follows each code word representing a level above the predetermined level to indicate to the receiver whether that sample is to be inserted at a Nyquist interval from the preceding sample or whether it is to be inserted at one-half a Nyquist interval from the preceding sample. Where the difference signal to be encoded is large due to a substantial change in the input signal, several such samples taken at twice the Nyquist rate serve to rapidly reduce the difference signal and provide a better approximation of the input signal to the receiver. The result is more accurate positioning of the edges of a television picture with a substantial reduction in "edge business."

The bandwidth needed to transmit the extra samples that are taken at twice the Nyquist rate during critical portions of the analog signal is supplied by utilizing a portion of the blanking interval associated with a video signal. To insure that the number of additional samples which are taken does not exceed the transmission space available during the blanking interval, a buffer circuit is provided between the encoder at the transmitter and the transmission line which, together with associated apparatus, serves to disable the pulses which sample at twice the Nyquist rate when the buffer is full.

BRIEF DESCRIPTION OF THE DRAWING

The present invention will be more fully comprehended from the following detailed description taken in conjunction with the drawings in which.

DETAILED DESCRIPTION

Figure 4:
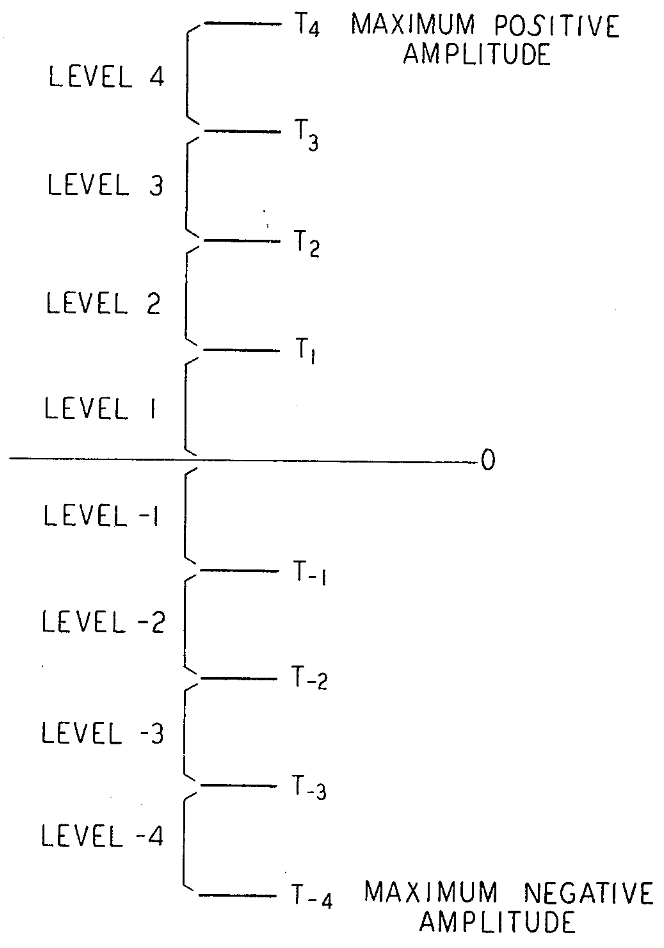
FIG. 4 illustrates the formation of the detection levels at the transmitter.

The analog signal, which may be a video signal, is applied from source 10 to one input terminal 11 of a subtractor circuit 12 whose output terminal 13 is connected to the input of a quantizer circuit 14. The quantizer circuit 14 contains seven threshold detectors 20, 21, 22, 23, 24, 25, and 26. The function of these threshold detectors is to divide the output of the subtractor circuit 12 into eight possible levels. An illustrative division is shown in FIG. 4 where four positive levels and four negative levels are shown. The eight levels are shown in FIG. 4 to have equal divisions but this is not a requirement and indeed in many applications the levels do not have equal divisions but are proportioned to suit the particular type of quantization desired. Threshold detectors 20, 21, and 22 serve to generate an output signal when the input signal is greater in amplitude than T3, T2, and T1, respectively, as shown in FIG. 4. Similarly, level detectors 26, 25, and 24 generate output signals when the input signals are greater in amplitude than T–3, T–2, and T–1, respectively. Threshold detector 23 generates an output pulse whenever the input signal applied to it is positive in polarity and generates a space or ground voltage whenever the input signal applied to it is negative in polarity. The output of threshold circuit 23 therefore is a sign bit indicative of the polarity of the signal at the output of the subtractor circuit 12.

In accordance with the present invention, the level detectors which detect signals below a predetermined amplitude T3 and T–3 are operated at the Nyquist rate to sample the input signals. This is accomplished by means of transmission gate 30 which is enabled by pulses having a pulse repetition rate equal to the Nyquist rate present at the output terminal 40 of clock source 41. The second input terminal of gate 30 is connected to the output terminal 13 of subtractor circuit 12 so that threshold circuits 21, 22, 23, 24, and 25 sample the output of subtractor circuit 12 at the Nyquist rate.

Figures 2, 3:
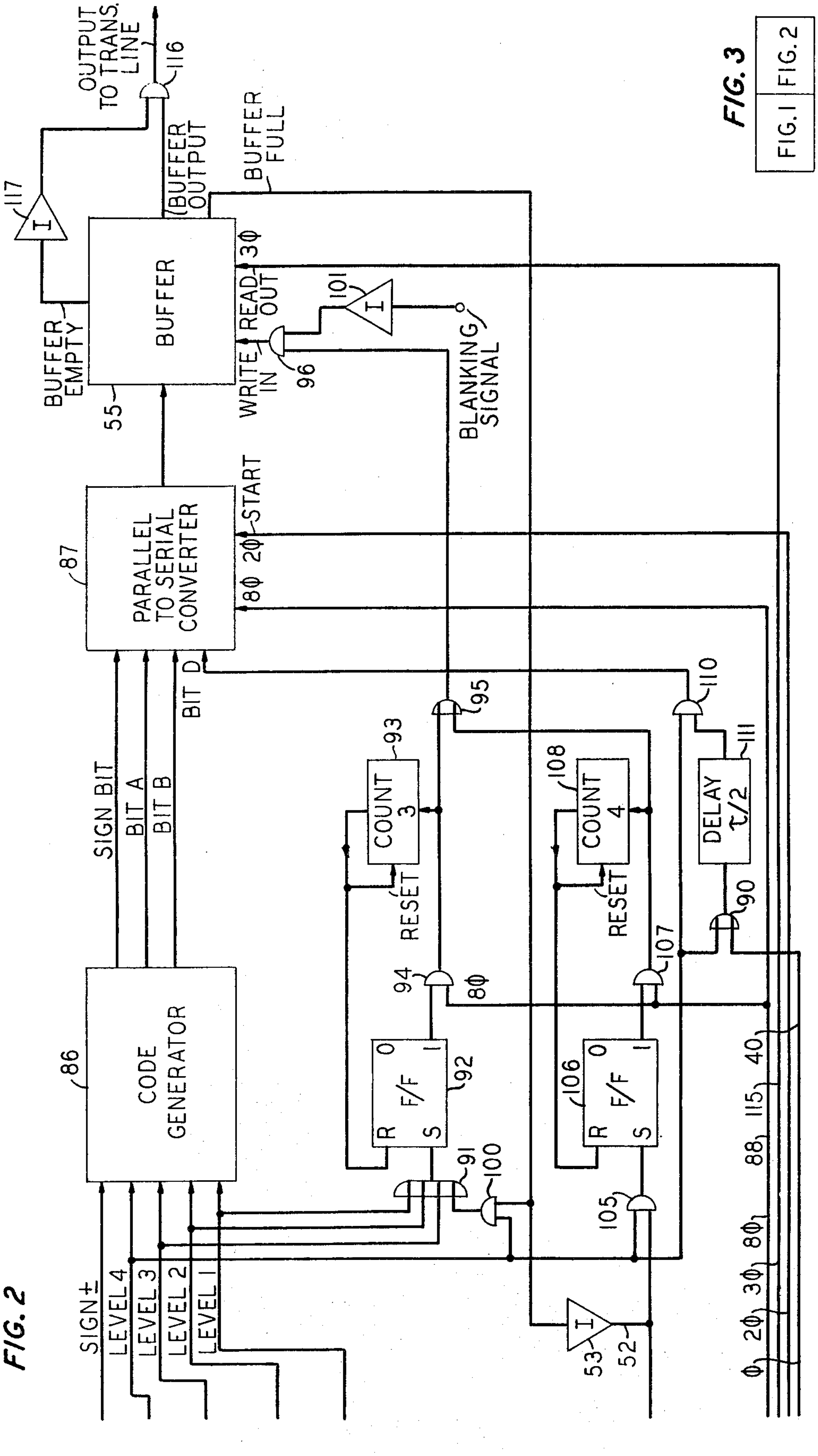
FIG. 2 is a portion of a block diagram of a transmitter embodying the present invention.
FIG. 3 is a drawing illustrating the arrangement of FIGS. 1 and 2 with respect to each other to provide a complete block diagram of a transmitter embodying the present invention.

In accordance with this invention threshold circuits 20 and 26, which operate to determine when a predetermined amplitude (in the illustrative example shown in FIG. 4 as T3 and T–3) is exceeded, are enabled by transmission gate 35 at twice the Nyquist rate. Transmission gate 35 has one input terminal connected to receive the output signal from subtractor circuit 12, and a second input terminal is connected to receive an enabling signal from the output of an OR gate 50 which is a signal occurring at twice the Nyquist rate. This signal from OR gate 50 is derived first by a connection from one input terminal of OR gate 50 directly to terminal 40 of source 41 and second, by a connection to the second input of OR gate 50 through a normally enabled AND gate 51 which is connected to receive the signal from terminal 40 delayed by a time interval equal to $\tau/2$ by delay circuit 36, $\tau$ is the Nyquist interval. As a result when AND gate 51 is enabled, AND gate 51 supplies a signal to one input of OR gate 50 which occurs at the Nyquist rate but is displaced by a delay equal to $\tau/2$ from the signal present at terminal 40. The addition of the two signals in OR gate 50 results in a generation of a pulse signal at the output of OR gate 50 occurring at twice the Nyquist interval. Referring to FIG. 2, AND gate 51 is normally enabled by a reference voltage present at the output terminal 52 of an inverting amplifier 53 whose input terminal is connected to the buffer full output terminal of a buffer circuit 55. When the buffer is not full, a zero appears at the buffer output terminal which is inverted by amplifier 53 to enable AND gate 51. When the buffer is full, however, a one, or reference voltage, is generated at the buffer full output terminal of buffer 55 and this serves to disable AND gate 51. The function of the buffer full signal is to prevent the quantizer from generating samples at twice the Nyquist interval when the buffer 55 is full indicating that the allowed transmission space within the blanking interval has been utilized.

The output of the threshold detector circuits 20 through 26 is not well suited for application to encoding apparatus. This is because when a high level detector is activated by a high input signal, all the level detectors capable of detecting signals of the same polarity are also activated. Thus, for example, when level detector 20 generates an output signal, level detectors 21 and 22 also generate an output signal. Similarly, when level detector 26 generates an output signal, level detectors 24 and 25 also generate an output signal. In order to obtain a unique output at a single terminal in response to a given level, additional apparatus comprising a series of inhibit gates 60, 61, 62, 63, 64, and 65, together with an inverting amplifier is provided. The arrangement of these gates is well known to those skilled in the art, the arrangement being such that when an output signal is produced by level detector 20 this signal, in addition to producing a discrete output at output terminal 70 of quantizer 14, serves to disable inhibit gate 60 connected between the output of level detector 21 and output terminal 71. Similarly, the output signal from level detector 21 serves to disable gate 61 which is connected between level detector 22 and output terminal 72, and gate 62 is disabled by any output from level detector 22. The arrangement of inhibit gates 65, 64, and 63 corresponds in arrangement to detectors 26, 25, and 24 as the arrangement of gates 60, 61, and 62 to detectors 20, 21, and 22. The output of level detector 23 is directly applied to output terminal 78 and in addition to being directly applied to one input terminal of gate 62 is also applied to an inverting amplifier 66 whose output is applied to the input terminal of gate 63. Thus, when the output of subtractor 12 exceeds the threshold shown in the left hand column below, there is a reference voltage at output terminal 78 and a reference voltage appears at the output terminal designated in the same line in the center column which is defined to be the level shown in the same line in the right hand column.

| Threshold | Output | Defined Level |
|---|---|---|
| T3 | 70 | L4 |
| T2 | 71 | L3 |
| T1 | 72 | L2 |

If the output of subtractor circuit 12 is positive in polarity but less than T1 in amplitude, then a pulse appears only at output terminals 73 and 78 and this is defined as level 1.

If the output of subtractor circuit 12 is negative in polarity, a ground voltage appears at output terminal 78 and if the output of subtractor circuit 12 is more negative than the level shown in the left hand column below there is a reference voltage generated at the output terminal shown in the same line in the center column below, which is defined to be the level shown in the same line in the right hand column.

| Threshold | Output | Defined Level |
|---|---|---|
| T–3 | 77 | L–4 |
| T–2 | 76 | L–3 |
| T–1 | 75 | L–2 |

If the output of subtractor circuit 12 is negative in polarity but less negative than T–1, then reference voltage appears at terminal 74 and this is defined as level L–1.

The output signals from quantizer 14 present at terminals 70 through 77 are applied to a digital-to-analog converter 80 which generates an analog signal which is then integrated by integrator circuit 81. Integrator circuit 81 shapes the error spectrum that is fed back to the second input terminal 82 of subtractor circuit 12 and, in the absence of great changes in the output signal from source 10, the feedback apparatus functions to maintain the level of the output signal at terminal 13 of subtractor circuit 12 at a relatively low level. In accordance with this invention whenever that output level rises to a level greater than T3 or more negative than T–3, the output level is then encoded at twice the Nyquist interval. The result is that error samples occurring at twice the Nyquist rate are encoded and transmitted. In addition, not only are these additional samples encoded and transmitted, but further they are fed back through the feedback path comprising converter 80 and integrator 81 to the subtractor circuit 12 so that they reduce the output level at terminal 13 of subtractor circuit 12 enabling the apparatus to "catch up" faster with the change in the input signal than would otherwise be the case if it were operating solely at the Nyquist rate. It should be noted that the number of quantization levels is not increased in order to overcome the problems of smearing heretofore discussed but, rather, the sampling rate is doubled so that more samples may be taken resulting in not only greater accuracy in horizontal positioning along a scan line of large changes in signal amplitude but a faster "catching up" through the feedback circuit.

The output signals from quantizer 14 are applied to a circuit 85 which functions to generate at one of four output terminals denoted Level 4, Level 3, Level 2, and Level 1, a signal denoting the absolute value of the level detected and at a fifth output terminal denoted sign ± a signal indicative of whether the level is for a signal which is positive or negative in polarity. The output of level detector produces a pulse or reference voltage when the polarity of the output of subtractor 12 is positive and a ground voltage when it is negative and so it is applied directly to the sign ± output of circuit 85 since it already contains the necessary information. The output terminals 70 and 77, 71 and 76, 72 and 75, and 73 and 74, are, respectively, combined in OR gates 45, 46, 47, and 48 to generate an output signal from one of those gates in response to a level having an absolute value 4, 3, 2, and 1, respectively.

The five output terminals from the circuit 85 are connected to a code generator 86 which functions to convert these signals into three bit code words, which three bits appear in parallel at the output terminals designated sign bit, Bit A and Bit B. The sign bit simply indicates by the presence of a "1" or a "0," respectively, whether the level which has been detected is positive or negative. Bit A and Bit B represent the four possible absolute levels of the input signal as shown in the table below:

| | Code | |
|---|---|---|
| | Bit B | Bit A |
| Level 1 | 0 | 0 |
| Level 2 | 0 | 1 |
| Level 3 | 1 | 0 |
| Level 4 | 1 | 1 |

In order to facilitate the encoding of information at twice the Nyquist rate when the level detected is level 4, each Nyquist interval is divided into eight parts. During the first three parts of the eight parts comprising the Nyquist interval, the code word representing the level is read into a parallel-to-serial converter 87 which is started by a start signal obtained from terminal 40 of clock source 41 and whose operation is governed by a signal occurring at eight times the Nyquist pulse repetition rate which is provided at terminal 88 of source 41. As a result the output of the code generator 86 is read into the parallel-to-serial converter 87 during the first three portions of the eight portions of the divided Nyquist interval. The output of the converter 87 is then applied to buffer circuit 55, and the write in of these signals into the buffer circuit 55 is governed by a write-in signal derived from certain counting apparatus described below.

The counting apparatus which governs the write in of the first three bits of each code word into buffer 55 comprises an OR gate 91, a bistable circuit 92, and a count-to-three counter 93 together with an AND gate 94, an OR gate 95, and an AND gate 96. OR gate 91 functions to govern the write in of signals to the buffer at the Nyquist interval. It is therefore connected to the level 1, level 2, and level 3 output terminals of circuit 85. It is also connected through an AND gate 100 to the level 4 output, but AND gate 100 is enabled only when the buffer is full so that level 4 samples are only encoded and transmitted at the Nyquist rate when there is no more transmission space available within the blanking interval to provide further transmission space for the transmission of samples taken at twice the Nyquist rate. Thus, when the buffer is full, AND gate 100 is enabled and the level 4 signals are also applied through OR gate 91 to set bistable circuit 92.

When bistable circuit 92 is set, reference voltage appears at its "1" output terminal to enable AND gate 94 which is also connected to receive the pulses appearing at output terminal 88 of clock source 41. These pulses occur at eight times the Nyquist interval and the resulting output from AND gate 94 is counted by counter circuit 93 until three such pulses are counted at which time the counter resets itself and, in addition, resets the bistable circuit, which disables AND gate 94. As a result the input signal applied to OR gate 95 from AND gate 94 consists of three pulses occurring during the first three parts of the eight parts of a Nyquist interval and these pulses are transmitted through OR gate 95 to AND gate 96 which is normally enabled and thence to the write-in terminal of buffer 55 so that the first three bits of the code word are read into the buffer 55. The AND gate 96 is enabled and "write in" to buffer 55 is accomplished at all times except during the blanking interval when a blanking signal appears at the blanking signal terminal and is inverted by inverting amplifier 101 to disable AND gate 96.

The above-described apparatus functions to read into the buffer 55 code words which represent samples taken at the Nyquist interval. Samples are taken at the Nyquist interval only when the level of the output from subtractor circuit 12 is less than threshold T–3 or greater than threshold T3, or when the buffer 55 is full and there is no additional channel space available within the blanking interval to transmit further information. At all other times, however, when the level of the output from subtractor circuit 12 is greater in absolute value than threshold 3 samples are taken and transmitted at twice the Nyquist interval. In order to accomplish such a result, the level 4 output of circuit 85 is applied to one input terminal of an AND gate 105 which is normally enabled by the reference output signal appearing at terminal 52 of inverting amplifier 53 in the absence of the buffer being full. Thus, when a level 4 signal occurs, AND gate 105 generates an output signal to set a bistable circuit 106 whose "1" output terminal is connected to one input terminal of AND gate 107 to enable that AND gate when the bistable circuit 106 is in the set condition. The second input terminal of AND gate 107 is connected to receive the signals appearing at output terminal 88 of source 41, which signals occur at eight times the Nyquist interval. The resulting output from AND gate 107 is counted by counter circuit 108 which, after counting four such pulses, resets itself and resets bistable circuit 106. The output signal from AND gate 107 is thus four pulses occurring during the first or second four of the eight parts of the Nyquist interval since level 4 is being sampled at twice the Nyquist rate and these pulses are applied through OR gate 95, and through normally enabled AND gate 96 to the write-in terminal of buffer 55. During the first three parts of this write-in signal the output of the parallel-to-serial converter 87 is read into the buffer. During the fourth or eighth part of the eight-part Nyquist interval, another bit denoted Bid D is read into the buffer.

The fourth bit, denoted Bit D is generated to indicate to the receiver apparatus whether a received sample indicating a level 4 is to be placed at the Nyquist interval or at one-half the Nyquist interval from the preceding sample. This Bit D signal is derived from the level 4 output of circuit 85 and if the level 4 output is present at one-half the Nyquist interval from the preceding sample, then a "1" is read into the Bit D input terminal of parallel-to-serial converter 87. This is accomplished by means of an AND gate 110 connected to receive the level 4 output of circuit 85 and enabled by the output of delay circuit 111 which provides a delay equal to $\tau/2$. The input to delay circuit 111 is a signal present at the output of an OR gate 90 whose inputs are connected to terminal 40 of source 41 and the level 4 output of circuit 85. Thus, if a level 4 is detected and a level was detected in the previous half interval, then AND gate 110 produces an output pulse which is applied to the serial-to-parallel converter and read out into the buffer following the three bits indicating the level 4.

The signals stored within the buffer 55 are read out under the control of a signal occurring at three times the Nyquist rate generated at output terminal 115 of clock source 41. The buffer output is applied to the normally enabled AND gate 116 which is disabled only at such times that the buffer contains no information at which time a buffer empty signal is generated by the buffer, inverted by an inverting amplifier 117 whose ground voltage output then disables AND gate 116.

Thus, in accordance with this invention the difference signals in a predictive PCM transmission signal are encoded at the Nyquist rate when they are below a predetermined threshold but are encoded at twice the Nyquist rate when the difference signals exceed that threshold. The difference signals are encoded for transmission but an extra bit follows each code word representing a level above the predetermined level to indicate to the receiver whether that sample is to be inserted at a Nyquist interval or one-half the Nyquist interval from the preceding sample. In the event of an extremely large change in the difference signal, samples will continue to be taken at twice the Nyquist interval until the difference signal is reduced. This serves to rapidly reduce the difference signal and by taking more samples during such intervals of time, greater accuracy is obtained.

Figure 5A:
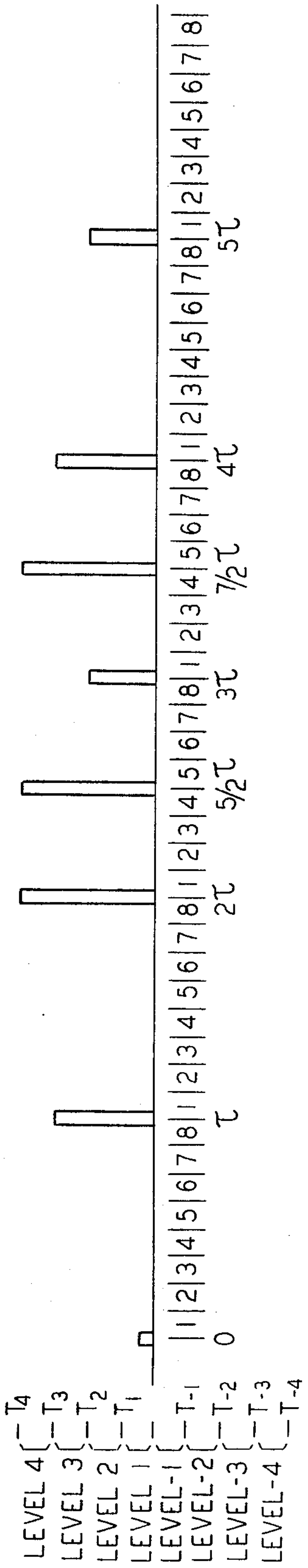
FIGS. 5A and 5B are two waveforms useful in understanding the operation of apparatus embodying the present invention.
Figure 5B:
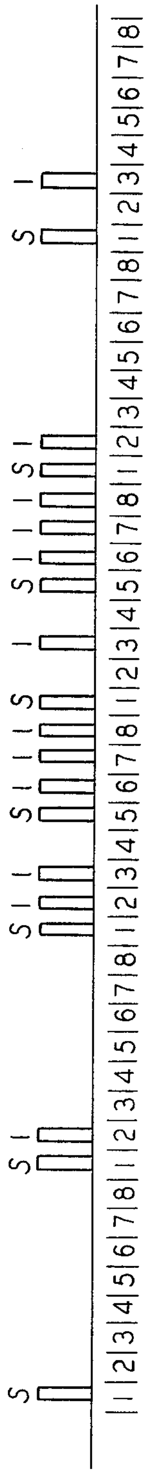

The illustrative samples shown in FIG. 5A are encoded for transmission as shown in FIG. 5B. At the Nyquist interval denoted "0" in FIG. 5A, a sample having an amplitude of level 1 is detected, and a sign bit, denoted with an "$s$" is transmitted during the first and "0" during the second and third parts of the eight parts of the Nyquist interval between a "0" and "$\tau$" to indicate that the sample has a positive polarity as shown in FIG. 5B. At the Nyquist interval $\tau$ shown in FIG. 5A, a sample of level 3 is present and this is transmitted as shown in FIG. 5B as a pulse during the first of the eight parts of a Nyquist interval denoting a positive amplitude and a "1" in the second such portion of the Nyquist interval followed by a "0" in the third such portion. By reference to the above-recited code, it may be seen that the signal "10" together with a pulse as a sign bit indicates a level 3. The "0" portion of the code is at the base line in the third portion of the transmitted signal. At the interval $2\tau$ a level 4 is detected and it is represented by a sign pulse followed by "11" in the second and third portions of the Nyquist interval. A "0" appears in the fourth portion of the Nyquist interval to indicate to the receiver apparatus that that sample is to be inserted at one Nyquist interval from the preceding sample. In contrast at five halves the Nyquist interval another level 4 is detected. This time during the fifth, sixth, seventh and eighth portions of the Nyquist interval between $2\tau$ and $3\tau$ pulses are transmitted to indicate not only the detection of a level 4 but also to indicate to the receiver that this sample is to be inserted not at one Nyquist interval from the preceding sample, but at one-half a Nyquist interval from the preceding sample. The other samples shown in FIG. 5A are encoded and transmitted as shown in FIG. 5B. Signals having levels −1, −2, −3 and −4, although not illustrated, are encoded in the same manner as signals having levels 1, 2, 3, and 4 with the exception of the fact that the sign bit is a zero.

Figure 6:
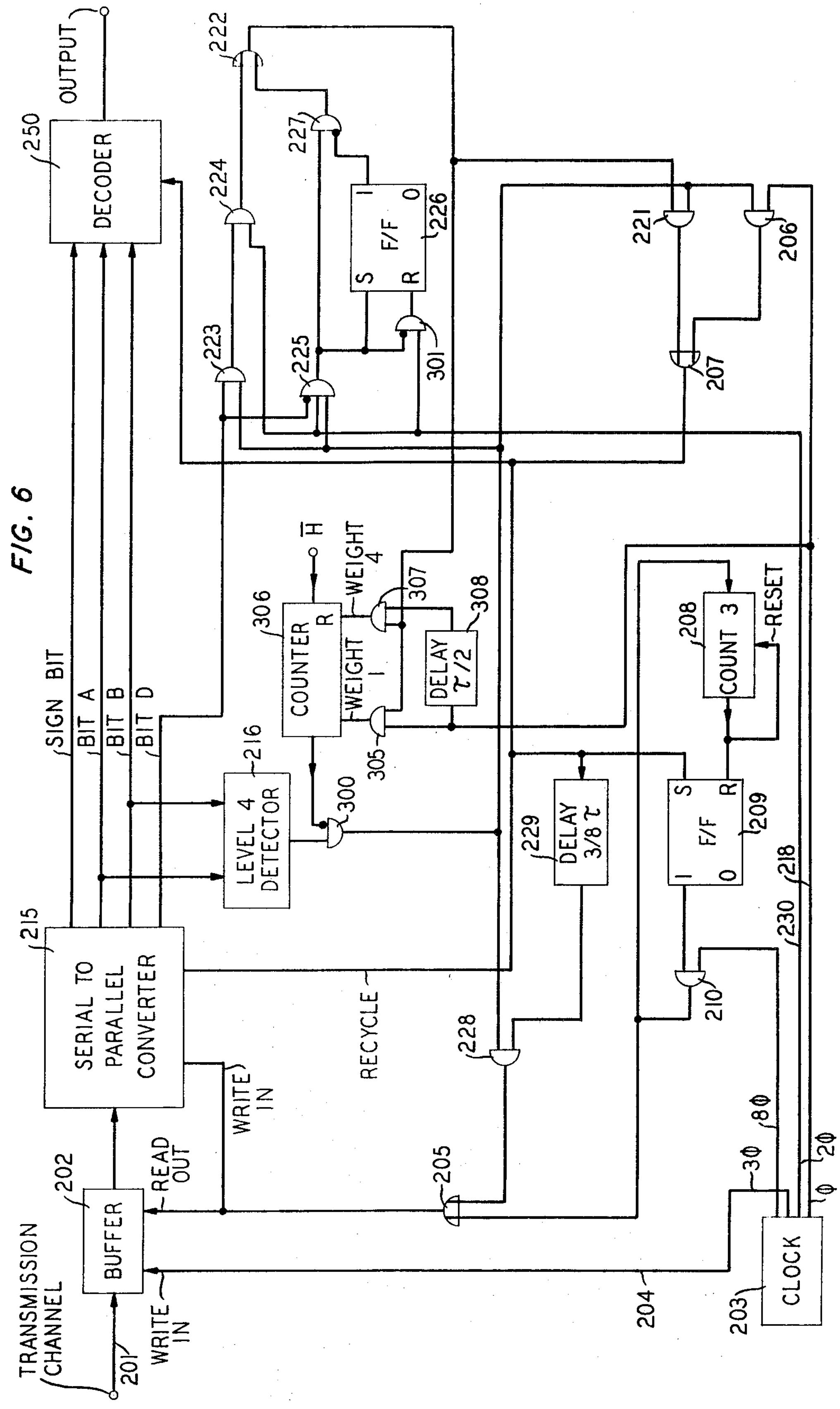
FIG. 6 is a block diagram of a receiver embodying the present invention.

A receiver for use in a transmission system embodying the present invention is shown in FIG. 6. The transmission channel is connected to an input terminal 201 of a buffer circuit 202 which operates under the control of a clock circuit 203 which generates clock pulses at three times the Nyquist rate at output terminal 204. These pulses occurring at three times the Nyquist rate are applied to the read-in terminal of buffer 202 to read into that buffer the signals transmitted over the transmission line.

The write out from buffer 202 is governed by a signal generated at the output terminal of an OR gate 205. The signal present at the output of OR gate 205 is determined in part by apparatus comprising inhibit gate 206, OR gate 207, a counter 208, a bistable circuit 209 and an AND gate 210, whose output terminal is connected to one input terminal of OR gate 205. This apparatus is in turn governed by the level represented by the received signal. The output from buffer 202 is applied to a serial-to-parallel converter 215 having four output terminals at which Bits A, B, D and the sign bit appear. A level detector 216 is connected to the Bit A and Bit B output terminals and generates a reference voltage at its output terminal 217 whenever the level 4 is detected. In the absence of the detection of the level 4 signal, inhibit gate 206 is enabled and pulses appearing at the Nyquist rate at terminal 218 of clock source 203 are transmitted through inhibit gate 206, OR gate 207 and serve to set bistable circuit 209. As a result, AND gate 210 is enabled by the reference voltage appearing at the "1" output terminal of bistable circuit 209 and pulses occurring at eight times the Nyquist rate are applied to the second input terminal of AND gate 210 and thence to one input terminal of OR gate 205 to govern the write out of the buffer in the absence of the detection of a level 4 signal. Only three such pulses are applied to the write-out terminal of the buffer, however, because counter circuit 208 counts three of the pulses generated by gate 210 and the resets the bistable circuit 209 as well as the counter itself to prevent further write out of signals in the buffer. Thus, in the absence of the detection of a level 4 signal, three bits are read out of buffer 202 through the serial-to-parallel converter 215 and applied to the decoder 250.

When a level 4 signal is detected, however, it is necessary to write out of the buffer four bits of information which represent not only the sign bit, the A Bit, and the B Bit, but also in addition, the D Bit. To accomplish this operation the output signal from level detector 216 enables inhibit gate 300 and AND gate 228 to allow a pulse from the output of gate 207 delayed by three-eighths of a Nyquist interval by delay circuit 229 to pass through OR gate 205 and write Bit D out of buffer 202. To determine whether the level 4 signal which has been detected should be inserted at a full Nyquist interval from the preceding sample or whether it should be inserted at one-half of a Nyquist interval from the preceding sample level detector 216 upon the detection of a level 4 output from converter 215 generates an output signal which, after passing through inhibit gate 300, serves to enable an AND gate 221 and to disable inhibit gate 206. AND gate 221 is connected to receive the output signals from an OR gate 222 whose operation, in turn, is governed by apparatus comprising an AND gate 223, an AND gate 224, an inhibit gate 225, a bistable circuit 226, an inhibit gate 227, and inhibit gate 301. Consider first that a "1" appears at the Bit D output terminal of converter 215. This signal has been "written" out of buffer 202 by the $\tau$ signal present at terminal 218 delayed three-eighths of the Nyquist interval by delay circuit 230 whose output, together with that appearing at the output of gate 300 causes a signal to be generated by AND gate 228 which is transmitted through OR gate 205. The Bit D output, in this example being a "1," together with the output signal from level detector 216 causes AND gate 223 to generate an output signal which is applied to one input terminal of AND gate 224. The other input terminal of AND gate 224 is connected to receive pulses occuring at twice the Nyquist rate at terminal 230 of source 203 so that gate 224 generates in response to a "1" in the Bit D and a level 4, an output signal which is transmitted through gate 222 to generate an output signal from AND gate 221 and initiate the generation of three pulses by AND gate 210 as heretofore described. Since gate 224 was enabled at one-half a Nyquist interval from the last $\tau$ pulse by the signal from delay circuit 229, the signals appearing at the output of OR gate 207 when applied to decoder 250 will cause the corresponding encoded sample to be decoded one-half a Nyquist interval from the preceding sample.

When Bit D is a "0" this indicates to the receiver that the sample representing a level 4 is to be inserted at a full Nyquist interval from the preceding sample. To accomplish this result the signal appearing at the Bit D output of converter 215 is applied to an inhibit terminal of inhibit gate 225 which generates an output pulse when a level 4 is detected at the same time that a pulse present at output terminal 230 of source 203 is present. The signals appearing at terminal 230 of source 203 occur at twice the Nyquist rate and gate 225 therefore generates pulses at twice the Nyquist rate when a level 4 is detected and Bit D is "0." The first such pulse sets bistable circuit 226 by applying a level "1" signal to the set input, and, by inhibit gate 301 disconnecting the 2Φ clock pulse of output 230 of source 203 from the reset terminal of flip-flop 226. The output of flip-flop 226 then inhibits gate 227. Bistable circuit 226, however, resets itself upon the occurrence of the next pulse occurring at twice the Nyquist rate, thereby enabling gate 227 so that the signal present at gate 225 is transmitted through gates 227, 222, 221 and 207 to the input of flip-flop 209 to cause three pulses to be generated by gate 210 one Nyquist interval after the preceding sample taken at the Nyquist interval. In short, bistable circuit 226 inhibits gate 227 for the first half Nyquist interval but does not inhibit it for the second Nyquist pulse.

Figure 1:
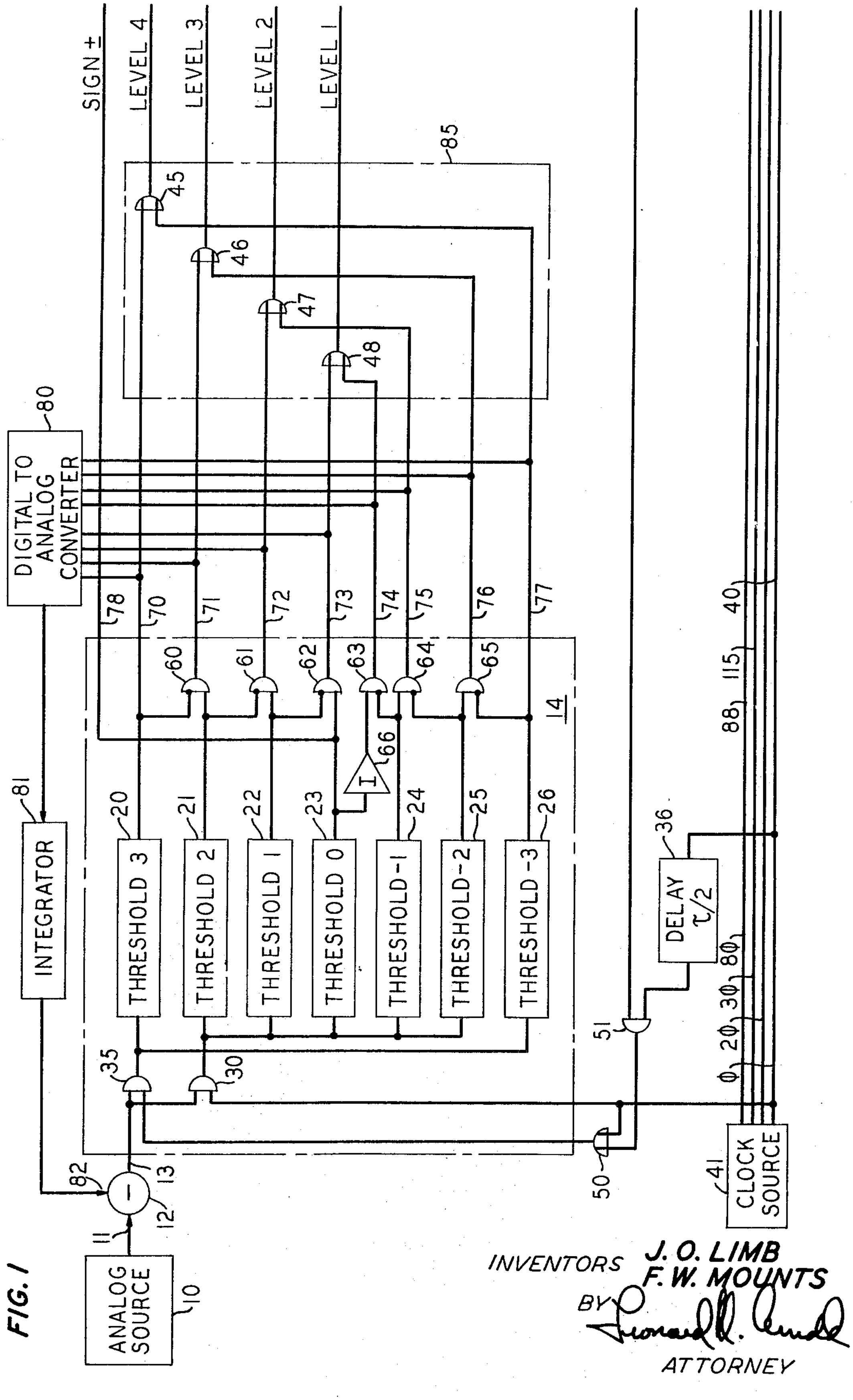
FIG. 1 is a block diagram of a portion of a transmitter embodying the present invention.

The signals present at the output of converter 215 are read out by the output signal from OR gate 207 into decoder 250. From the above description it is apparent that the signal present at the output of 207 is determined by the nature of the Bit D signal when a level 4 is detected. Finally, the decoder 250, in response to the coded bits, generates an analog output signal corresponding to the signal generated by source 10 in FIG. 1.

Additional circuitry prevents the readout of Bit D when it has been inhibited at the transmitter due to a full buffer and the placement of level 4 outputs at half sample points. A clock pulse is allowed through gate 222 when a level 4 occurs, and it is in the correct phase for reading the data into the decoder 250. This pulse is fed to AND gate 305 together with the clock pulse Φ. An output clock pulse at gate 305 will occur whenever an output occurs on gate 222 at the same time as Φ. The output of gate 305 is fed to counter 306 and increments it by one count. The output of gate 222 also enters gate 307 and produces an output at gate 307 if the output of gate 222 is in phase with the clock pulse delay by one-half pulse period by delay circuit 308. The output of gate 307 is also applied to the counter and increments it by four counts. The counter 306 thus contains at any instant the number of storage allocations that have been used by the encoding buffer 55. When the counter reaches a count equal to the number of storage locations in the encoding buffer 55 the counter output changes to a logic "1" level and inhibits gate 300 so that the level 4 detector output is inhibited from reaching gates 228, 223, 225, 221, and 206. Consequently, no Bit Ds will be read from the buffer and the signal into the decoder 250 will be clocked by the clock pulse Φ fed through gates 206 and 207. At the end of each horizontal scanning line the sync pulse resets the counter allowing the output of level 4 detector 216 to operate.

It is to be understood that the above-described arrangements are illustrative of the application of the principles of the invention. Numerous other arrangements may be devised by those skilled in the art without departing from the spirit and scope of the invention.

What is claimed is:

1. A transmission system comprising, in combination,
   a source of an analog information signal,
   a subtractor circuit for obtaining a difference signal by subtracting from said analog information signal generated feedback signals,
   means for sampling said difference signal at predetermined intervals when said difference signal is less than the absolute value of a predetermine level,
   means for sampling said difference signal at said predetermined intervals and midway between said predetermined intervals when said difference signal is equal to or greater than the absolute value of a predetermined level,
   means for quantizing said samples of said difference signal,
   a digital-to-analog converter connected to receive said quantized samples.
   an integrator circuit connected between the output of said converter and said subtractor circuit to provide said generated feedback signals,
   means for encoding and transmitting said quantized samples said encoding and transmitting means including a store capable of storing a predetermined quantity of information said encoding and transmitting means operating to encode and transmit all quantized samples when the quantity of information stored in said store is less than said predetermined quantity and to encode only samples taken at said predetermined intervals when the quantity of information stored in said store is equal to or greater than said predetermined quantity and also including apparatus to transmit information to indicate whether an encoded sample representing a level equal to or greater than said predetermined level was obtained by said sampling means at one said predetermined interval or at an interval occurring midway between, and
   receiver apparatus connected to receive said transmitted signals to reconstruct said information signal.

2. Apparatus in accordance with claim 1 wherein said encoding and transmitting means comprises,
   a code generator connected to receive the output of said quantizing means and a parallel-to-serial converter connected between said store and said code generator, and
   said means to transmit information to indicate whether an encoded sample was obtained at one of said predetermined intervals or an interval occurring midway between comprises an AND gate enabled at intervals midway between said predetermined intervals and connected to receive an output from said quantization means indicative of the occurrence of a level equal to or greater than said predetermined level and having an output connected to the input of said serial-to-parallel converter.

3. Apparatus in accordance with claim 1 wherein said receiver apparatus comprises in combination,
   a buffer store connected to receive said transmitted signals, a serial-to-parallel converter connected to the output of said buffer store, a detector connected to the output of said converter to detect the reception of digital signals representing a level equal to or greater in absolute value than said predetermined level and generate an output upon such detection, means responsive to said level detector output to cause said buffer to write out an extra bit when said level detector generates an output, storage means connected to the output of said converter, and means to govern the interval at which signals are generated at the output of said storage means in accordance with the information contained in said extra bit.

* * * * *